US011718327B1

(12) United States Patent
Marcolino Quintao Severgnini et al.

(10) Patent No.: US 11,718,327 B1
(45) Date of Patent: Aug. 8, 2023

(54) SYSTEMS AND METHODS FOR OPERATING A VEHICLE BASED ON A USER'S HEALTH AND EMOTIONAL STATE

(71) Applicant: Toyota Motor Engineering & Manufacturing North America, Inc., Plano, TX (US)

(72) Inventors: Frederico Marcolino Quintao Severgnini, Ann Arbor, MI (US); Sean P. Rodrigues, Ann Arbor, MI (US); Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/883,058

(22) Filed: Aug. 8, 2022

(51) Int. Cl.
*B60W 60/00* (2020.01)
*B60W 50/14* (2020.01)

(52) U.S. Cl.
CPC ........ *B60W 60/0051* (2020.02); *B60W 50/14* (2013.01); *B60W 60/0016* (2020.02); *B60W 60/007* (2020.02); *B60W 2050/146* (2013.01); *B60W 2540/22* (2013.01); *B60W 2540/221* (2020.02); *B60W 2540/223* (2020.02); *B60W 2540/225* (2020.02); *B60W 2540/229* (2020.02); *B60W 2540/24* (2013.01); *B60W 2540/26* (2013.01)

(58) Field of Classification Search
None
See application file for complete search history.

(56) References Cited

U.S. PATENT DOCUMENTS

| 6,104,296 | A | 8/2000 | Yasushi et al. |
| 9,440,657 | B1 | 9/2016 | Fields et al. |
| 10,067,505 | B2 * | 9/2018 | Ichikawa .......... B60W 60/0053 |
| 10,649,452 | B2 * | 5/2020 | Ichikawa .......... B60W 60/0053 |
| 10,922,566 | B2 * | 2/2021 | el Kaliouby .......... G06V 20/597 |
| 11,106,309 | B1 * | 8/2021 | Trapero Martin ...... G06F 3/042 |
| 11,385,639 | B2 * | 7/2022 | Ichikawa .............. B60W 40/00 |
| 11,453,414 | B2 * | 9/2022 | Bader .................... B60W 40/08 |
| 11,488,466 | B2 * | 11/2022 | Lewis .................... G08B 25/10 |
| 11,518,373 | B2 * | 12/2022 | Lee ..................... B60W 60/005 |
| 2015/0066284 | A1 | 3/2015 | Yopp |

(Continued)

FOREIGN PATENT DOCUMENTS

| CN | 105523038 A | * | 4/2016 | ........... A61B 5/0022 |
| CN | 107290870 A | * | 10/2017 | ............... A61B 5/04 |

(Continued)

*Primary Examiner* — Kevin R Steckbauer
(74) *Attorney, Agent, or Firm* — Christopher G. Darrow; Darrow Mustafa PC

(57) ABSTRACT

Systems, methods, and other embodiments described herein relate to monitoring a vehicle user's health and initiating a vehicle action based on the user's health and emotional state. In one embodiment, a method includes, responsive to detecting an event based on sensor data, requesting a user place the user's hand on an electrodermal activity (EDA) sensor. The EDA sensor is fixed to a dual-sided transparent display. The method includes acquiring EDA data relating to the user via the EDA sensor, determining a condition of the user based on the EDA data, and implementing a vehicle action in response to the condition of the user.

19 Claims, 7 Drawing Sheets

(56) References Cited

U.S. PATENT DOCUMENTS

| | | | |
|---|---|---|---|
| 2017/0017233 A1* | 1/2017 | Ichikawa | G05D 1/0061 |
| 2018/0329416 A1* | 11/2018 | Ichikawa | B60W 60/0053 |
| 2018/0330178 A1* | 11/2018 | el Kaliouby | B60W 50/082 |
| 2019/0152492 A1 | 5/2019 | el Kaliouby et al. | |
| 2019/0225232 A1* | 7/2019 | Blau | G05D 1/0088 |
| 2019/0391581 A1* | 12/2019 | Vardaro | A61B 5/02055 |
| 2020/0168074 A1* | 5/2020 | Lewis, Jr. | G08B 21/22 |
| 2020/0241525 A1* | 7/2020 | Harbour | A61B 5/7405 |
| 2020/0241528 A1* | 7/2020 | Ichikawa | G05D 1/0088 |
| 2020/0285069 A1* | 9/2020 | Villalpando | G06F 3/167 |
| 2020/0307647 A1* | 10/2020 | Bader | A61B 5/4809 |
| 2020/0317210 A1* | 10/2020 | Yang | B60W 50/14 |
| 2020/0329884 A1* | 10/2020 | Matson | A61B 5/318 |
| 2020/0379460 A1* | 12/2020 | Stent | G06V 10/82 |
| 2021/0122366 A1* | 4/2021 | Lee | B60W 30/09 |
| 2021/0323559 A1* | 10/2021 | De Weser | G06N 20/00 |
| 2021/0326020 A1 | 10/2021 | Gray et al. | |
| 2021/0339759 A1* | 11/2021 | Fouad | B60W 60/0051 |
| 2022/0061692 A1* | 3/2022 | Marcolino Quintao Severgnini | A61B 5/165 |
| 2022/0121200 A1* | 4/2022 | Ichikawa | B60W 60/0053 |
| 2022/0121285 A1* | 4/2022 | Severgnini | B25J 13/084 |
| 2022/0214803 A1* | 7/2022 | Trapero Martin | G06V 40/10 |
| 2022/0265214 A1* | 8/2022 | Jariwala | A61B 5/7203 |
| 2022/0337696 A1* | 10/2022 | Abutabl | B60K 28/066 |

FOREIGN PATENT DOCUMENTS

| | | | | |
|---|---|---|---|---|
| CN | 207045104 U | * | 2/2018 | |
| CN | 110262085 A | * | 9/2019 | |
| CN | 111762176 A | * | 10/2020 | A61B 3/113 |
| CN | 112693469 A | * | 4/2021 | |
| CN | 113598773 A | * | 11/2021 | B60W 40/09 |
| CN | 113782646 A | * | 12/2021 | |
| CN | 114746018 A | * | 7/2022 | A61B 5/02055 |
| DE | 102014100965 A1 | * | 7/2015 | A61B 5/18 |
| DE | 102014100965 B4 | * | 1/2016 | A61B 5/18 |
| DE | 102014222355 A1 | * | 5/2016 | G08B 21/06 |
| DE | 102016212422 A1 | * | 1/2017 | B60W 40/00 |
| DE | 102019203080 A1 | * | 6/2020 | |
| DE | 102019204201 A1 | * | 10/2020 | A61B 3/113 |
| DE | 102020204835 A1 | * | 4/2021 | B60W 10/04 |
| DE | 102019218302 A1 | * | 5/2021 | |
| DE | 102020201439 A1 | * | 8/2021 | |
| EP | 3895949 A1 | * | 10/2021 | B60W 40/09 |
| EP | 4074568 A1 | * | 10/2022 | A61B 5/0205 |
| FR | 3105142 A1 | * | 6/2021 | B60K 35/00 |
| JP | 2998233 B2 | * | 1/2000 | |
| JP | 2008003868 A | * | 1/2008 | |
| JP | 2016126500 A | * | 7/2016 | |
| WO | WO-2006090371 A2 | * | 8/2006 | A61B 5/165 |
| WO | WO-2007052729 A1 | * | 5/2007 | A61B 5/18 |
| WO | 202151593 A1 | | 3/2021 | |
| WO | WO-2021102050 A1 | * | 5/2021 | A61B 5/02055 |
| WO | WO-2022150206 A1 | * | 7/2022 | G04G 21/025 |

\* cited by examiner

_US 11,718,327 B1_

SYSTEMS AND METHODS FOR OPERATING A VEHICLE BASED ON A USER'S HEALTH AND EMOTIONAL STATE

FIELD

The subject matter described herein relates in general to vehicle operation and, more particularly, vehicle operation in response to a vehicle user's health and emotional state.

BACKGROUND

Some vehicles are equipped with one or more driver assistance systems and/or can be operated in an autonomous or semi-autonomous mode. The driver assistance systems can be manually activated or deactivated by a user. Similarly, the user can manually select between an autonomous mode, a semi-autonomous mode, and a non-autonomous mode.

SUMMARY

This section generally summarizes the disclosure and is not a comprehensive explanation of its full scope or all its features.

In one embodiment, a system for operating a vehicle in response to a condition of a vehicle user is disclosed. The system includes a dual-sided transparent display and an Electrodermal activity (EDA) sensor fixed to the dual-sided transparent display. The system includes a processor and a memory in communication with the processor. The memory stores machine-readable instructions that, when executed by the processor, cause the processor to, responsive to detecting an event based on sensor data, request a user place a hand of the user on the EDA sensor. The memory stores machine-readable instructions that, when executed by the processor, cause the processor to acquire EDA data relating to the user via the EDA sensor, determine a condition of the user based on the EDA data, and implement a vehicle action in response to the condition of the user.

In another embodiment, a method for operating a vehicle in response to a condition of a user is disclosed. The method includes, responsive to detecting an event based on sensor data, requesting a user place a hand of the user on an EDA sensor. The EDA sensor is fixed to a dual-sided transparent display. The method includes acquiring EDA data relating to the user via the EDA sensor, determining a condition of the user based on the EDA data, and implementing a vehicle action in response to the condition of the user.

In another embodiment, a non-transitory computer-readable medium for operating a vehicle in response to a condition of a user and including instructions that, when executed by a processor, cause the processor to perform one or more functions, is disclosed. The instructions include instructions to, responsive to detecting an event based on sensor data, request a user place a hand of the user on an EDA sensor. The EDA sensor is fixed to a dual-sided transparent display. The instructions include instructions to acquire EDA data relating to the user via the EDA sensor, determine a condition of the user based on the EDA data, and implement a vehicle action in response to the condition of the user.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
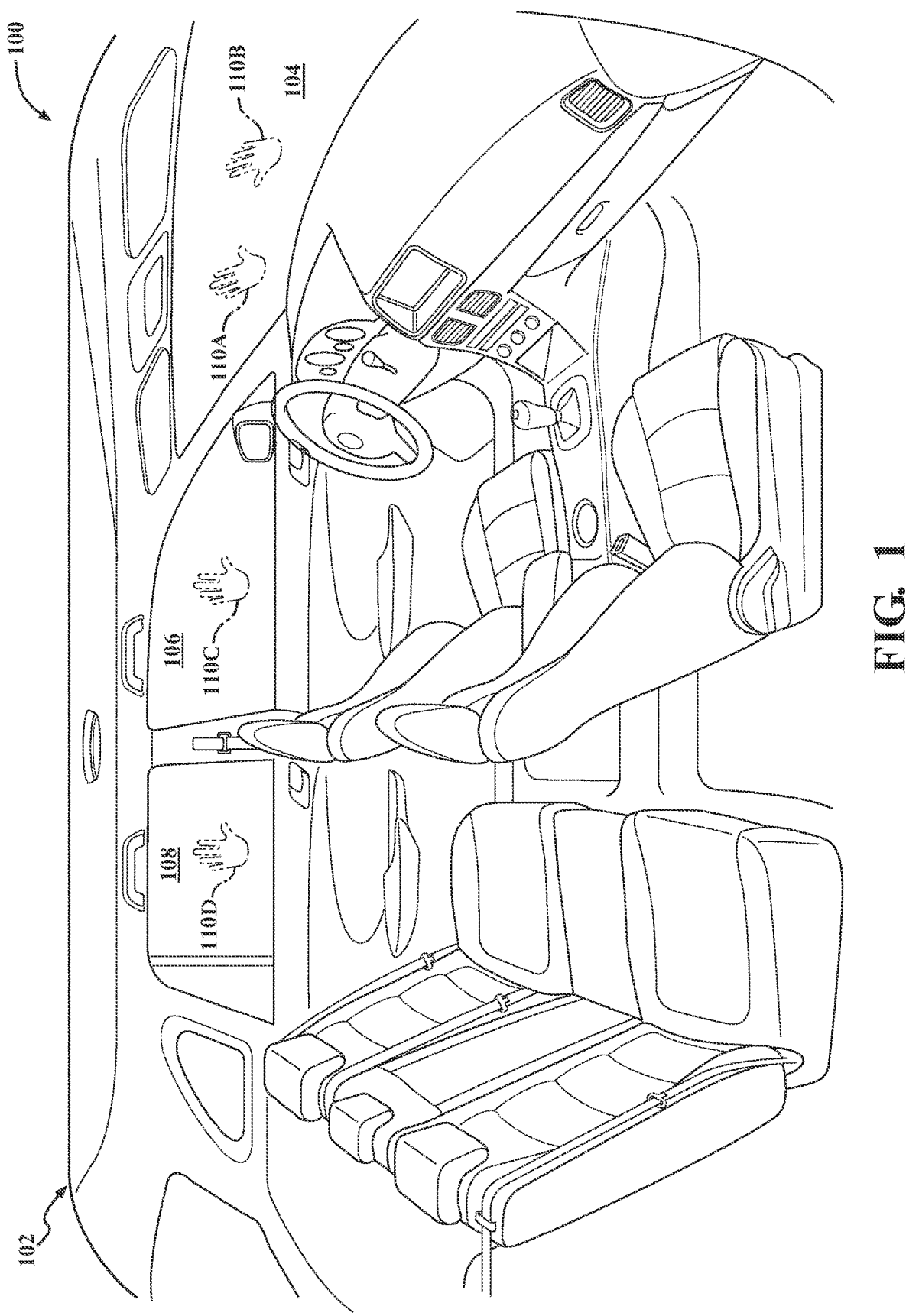
FIG. 1 is an example of an Electrodermal Activity (EDA)-based vehicle control system.

Systems, methods, and other embodiments associated with controlling a vehicle system based on a condition of a user, are disclosed. A user that is distracted, fatigued, sleepy, and/or experiencing a health crisis while operating a vehicle may be unable to control the vehicle effectively, which may endanger the user and other road users. Accordingly, in one embodiment, the disclosed approach is an electrodermal activity (EDA)-based vehicle control system that determines the condition of the user and further determines and implements a vehicle action that is an adequate response (or reaction) to the condition of the user.

Electrodermal activity (EDA) is a biosensing technique used in psychology and medicine to detect emotional arousal, measure distress levels, and/or predict seizures, among other things. EDA is the measurement of skin transpiration in the palm and/or fingers of a user. An emotional state of the user can be identified based on the determined EDA.

A vehicle that includes the EDA-based vehicle control system may further include one or more dual-sided transparent displays. The dual-sided transparent display has two sides and can display visual content such as images and/or videos on the two sides. The content can be the same on the two sides or can be different. The dual-sided transparent display can display visual content on one side and not on the other side. Alternatively, the dual-sided transparent display can be transparent. The dual-sided transparent display can be located in at least one of a vehicle window or a windshield. As such, the dual-sided transparent display may be a portion of the vehicle window and/or the windshield.

The vehicle action may be one of adjusting the dual-sided transparent display, adjusting a visual device, adjusting an audio device, assuming control of a vehicle, contacting an emergency service, or performing a medical intervention.

The vehicle can include one or more sensors. The sensors can be located inside the vehicle, such as in the vehicle cabin, and/or outside the vehicle. The sensors can include internal camera(s) that can monitor the user, the actions of the user, and the facial expressions of the user. The sensors can include external camera(s) that can monitor the environment surrounding the vehicle. The sensors can include a microphone that can detect sounds inside the vehicle, such as sounds made by the user. The sensors can include biometric sensors for detecting and recording biological characteristics (e.g., heart rate, temperature, oxygen levels, blood sugar levels, blood pressure levels) from the user. The sensors can include EDA sensor(s) for determining whether the user is distracted, fatigued, sleepy, happy, and/or sad. The EDA sensor(s) are fixed to one or more dual-sided transparent displays.

As an example, the EDA-based vehicle control system can receive sensor data from the sensor(s) such as the camera(s), the microphone(s), and the biometric sensor(s). Based on the sensor data, the EDA-based vehicle control system can determine that the user(s) may be distracted by a health issue (e.g., a stroke, a heart attack, an asthma attack) or an emotional issue (e.g., fatigued, sad, happy, nervous, sleepy, distracted).

In response to determining that the user(s) may be distracted by a health issue and/or an emotional issue, the EDA-based vehicle control system may request that the user(s) place their palm on the EDA sensor(s). The EDA sensor may measure the EDA of the user and the EDA-based vehicle control system may determine whether the user(s) is having a health issue or an emotional issue as well as which health or emotional issues the user(s) is experiencing.

Upon determining the type of issue the user is experiencing, the EDA-based vehicle control system may disable a viewing screen or a speaker if the EDA-based vehicle control system determines that the user is distracted by the viewing screen or the speaker, respectively. As another example, the EDA-based vehicle control system may take over control of the vehicle and call an emergency service if the EDA-based vehicle control system determines that the user is having a health issue such as a heart attack. As another example, the EDA-based vehicle control system may display relevant information on the dual-sided transparent display if the EDA-based vehicle control system determines that the user is distracted and/or fatigued. In such an example, the EDA-based vehicle control system may control the dual-sided transparent display to highlight (or illuminate an outline of) objects in the environment surrounding the vehicle that are visible through the dual-sided transparent display. The EDA-based vehicle control system may further annotate traffic signs and road markers on the dual-sided transparent display. As another example, the EDA-based vehicle control system may assume control of the vehicle such as navigation, steering, braking, etc., and may control the dual-sided transparent display to be opaque to provide privacy for the user if the EDA-based vehicle control system determines that the user is asleep, otherwise incapacitated, or performing other activities that user may prefer to perform in private such as exercising, working, or cooking. The EDA-based vehicle control system may transmit information relating to the condition of the user to a third party such as a medical emergency service, a fire service, and/or a police service.

It will be appreciated that arrangements described herein can provide numerous benefits, including one or more of the benefits mentioned herein. For example, arrangements described herein enhance the accuracy of the determining the condition of the user by combining sensor data from multiple sensor sources including camera(s), microphone(s), biometric sensor(s), and/or EDA sensor(s). Arrangements described herein can acquire the electrodermal activity of the user in a non-invasive manner. Arrangements described herein can acquire EDA measurements without a continuous connection to the user's skin. Arrangements described herein can acquire EDA measurements without the use of glued electrodes. Arrangements described herein can provide accurate electrodermal activity measurements. Arrangements described herein can result in reduced computing and processing power requirements. Arrangements described herein can result in identifying the emotional state of a user.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of electrodermal activity (EDA)-based vehicle control system 100 is shown. The EDA-based vehicle control system 100 can include various elements, which can be communicatively linked in any suitable form. As an example, the elements can be connected, as shown in FIG. 1. Some of the possible elements of the EDA-based vehicle control system 100 are shown in FIG. 1 and will now be described. It will be understood that it is not necessary for the EDA-based vehicle control system 100 to have all of the elements shown in FIG. 1 or described herein. The EDA-based vehicle control system 100 can have any combination of the various elements shown in FIG. 1. Further, the EDA-based vehicle control system 100 can have additional elements to those shown in FIG. 1. In some arrangements, the EDA-based vehicle control system 100 may not include one or more of the elements shown in FIG. 1. Further, it will be understood that one or more of these elements can be physically separated by large distances.

The EDA-based vehicle control system 100 includes a dual-sided transparent display 104, 106, 108 and EDA sensor(s) 110A, 110B, 110C, 110D (collectively known as 110) fixed to the dual-sided transparent display(s) 104, 106, 108. One example of a dual-sided transparent display that can be utilized as the dual-sided transparent display 104, 106, 108 is shown in U.S. Pat. App. Pub. No. 2021/0389615A1 to Rodrigues and is hereby incorporated by reference in its entirety.

The dual-sided transparent display 104, 106, 108 includes a transparent display which can be configured to display content, such as text, images, and/or video. The dual-sided transparent display 104, 106, 108 includes an inner side, facing user(s) inside the vehicle 102 and an outer side, facing observer(s) outside the vehicle 102. The dual-sided transparent display 104, 106, 108 can be configured to display content on one of or both the inner and outer sides of the dual-sided transparent display 104, 106, 108. As an example, the dual-sided transparent display 104, 106, 108 can display content on the inner side of the dual-sided transparent display 104, 106, 108 such that the content is visible to the user(s) inside the vehicle 102 and not visible to the observer(s) outside the vehicle 102.

As another example, the dual-sided transparent display 104, 106, 108 can display content on the outer side of the dual-sided transparent display such that the content is visible to the observer(s) outside the vehicle 102 and not visible to user(s) inside the vehicle 102. As another example, the dual-sided transparent display 104, 106, 108 can display content that is visible to both the user(s) in the vehicle 102 and the observer(s) outside the vehicle 102. In another example, the dual-sided transparent display 104, 106, 108 can display content on the inner side that differs from the content on the outer side. In yet another example, the dual-sided transparent display 104, 106, 108 can be transparent such that the user(s) in the vehicle 102 can see outside the vehicle 102 and the observer(s) outside the vehicle 102 can see into the vehicle 102.

The dual-sided transparent display 104, 106, 108 can be formed using materials that are substantially transparent or clear. As an example, the dual-sided transparent display 104, 106, 108 may be formed using glass or plastic. The dual-sided transparent display 104, 106, 108 can be used in connection with a screen, such as a laptop screen, a mobile device screen etc., or a window, such as a building window, a vehicle window, etc. In such a case, the dual-sided transparent display 104, 106, 108 can form at least a portion of a building window, a vehicle window, or a windshield.

The EDA sensor(s) 110 can include one or more sensing surfaces. As an example, the sensing surface can include a plurality of electrode pairs and one or more skin conductance sensors. The sensing surface can include an electrically insulating material. The sensing surface can include a rigid surface, which is a surface that can maintain its shape when a pressure is exerted on it (e.g., polymer). Alternatively, the sensing surface can be a compliant surface, which is a surface that deviates from its original shape in response to a pressure being exerted on it (e.g., Polydimethylsiloxane (PDMS) or rubber). The sensing surface can be of any material that does not conduct electricity and can be suitable for at least partially embedding or fixing the electrode pairs. The one or more sensing surfaces can be integrated into any suitable vehicle component, particularly the dual-sided transparent display 104, 106, 108.

The sensing surface(s) can be formed using any suitable method, e.g., conventional printed circuit board (PCB) manufacturing technology, flex circuit manufacturing technology where thin electrodes are embedded in a flexible Kapton substrate, screen printing or multi-material additive manufacturing. The electrodes can be of any material suitable for permitting skin conductance and acquiring electrodermal activity. As an example, the electrodes can be standard silver-silver chloride (Ag/AgCl) electrodes. As another example, the electrodes can be stainless steel electrodes. As another example, the electrodes can be transparent electrodes. In such an example, the transparent electrodes will not block portions of the dual-sided transparent display from view. Transparent electrodes may be formed using, as an example, Indium Tin Oxide (ITO).

In response to making contact with a user's hand, the EDA sensor(s) 228 can transmit an electric signal from one of an electrode pair to an other of the electrode pair via the user's skin. The EDA sensor(s) use any suitable calculations and/or algorithms to evaluate and determine accurate EDA data based on measurements of the electric signal. The EDA sensor(s) can identify and reduce noise in EDA data measurements. The EDA sensor(s) can evaluate the EDA measurements to determine the emotional state of the user. The EDA sensor(s) may be used to determine whether the user is fatigued, distracted, and/or experiencing an emotion such as being happy or sad.

The EDA sensors can be fixed on the surface of the dual-sided transparent display 104, 106, 108. More specifically, the electrodes of the EDA sensors can be fixed on the surface of the dual-sided transparent display 104, 106, 108. As an example, the electrodes may be fixed relatively evenly across the surface of the dual-sided transparent display 104, 106, 108. As another example, the electrodes may be concentrated in a portion of the dual-sided transparent display 104, 106, 108. The dual-sided transparent display 104, 106, 108 may be embedded with a visible material outlining the location of electrodes in the dual-sided transparent display 104, 106, 108. As shown in FIG. 1 and as an example, the visible material may be in the form of a hand outline. As another example, the dual-sided transparent display 104, 106, 108 may illuminate the portion of the dual-sided transparent display 104, 106, 108 to which the electrodes are fixed. The dual-sided transparent display 104, 106, 108 may utilize any suitable method for presenting the location of the electrodes to the user.

Figure 2:
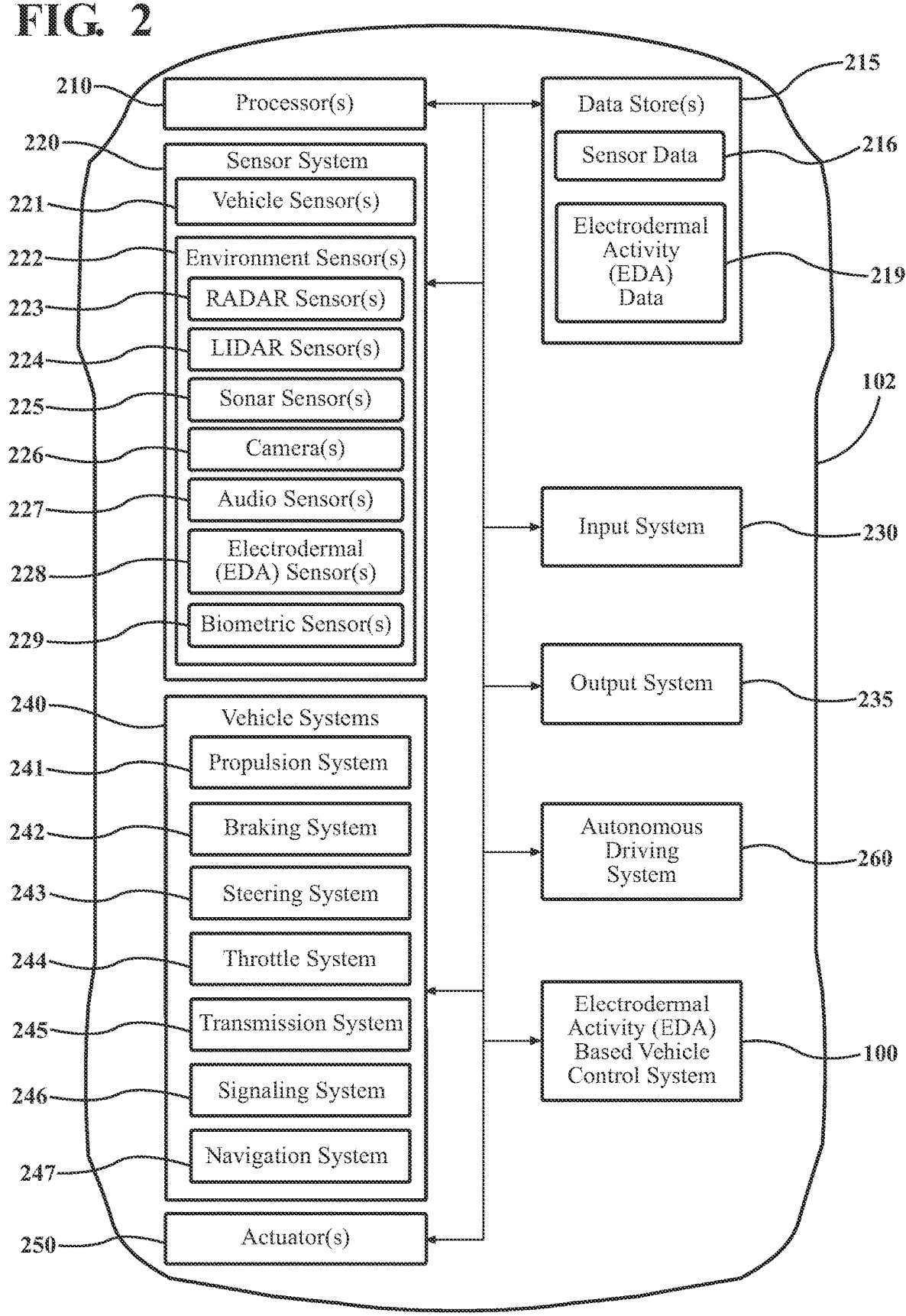
FIG. 2 illustrates a block diagram of a vehicle incorporating the EDA-based vehicle control system.

Referring to FIG. 2, a block diagram of a vehicle 102 incorporating an EDA-based vehicle control system 100 is illustrated. The vehicle 102 includes various elements. It will be understood that in various embodiments, it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances. For example, as discussed, one or more components of the disclosed system can be implemented within a vehicle while further components of the system can be implemented within a cloud-computing environment.

Some of the possible elements of the vehicle 102 are shown in FIG. 2 and will be described along with subsequent figures. However, a description of many of the elements in FIG. 2 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the vehicle 102 includes an EDA-based vehicle control system 100 that is implemented to perform methods and other functions as disclosed herein relating to controlling a vehicle system in response to a user's condition as determined by an EDA sensor 228. As an example, the EDA-based vehicle control system 100, in various embodiments, may be implemented partially within the vehicle 102 and may further exchange communications with additional aspects of the EDA-based vehicle control system 100 that are remote from the vehicle 102 in support of the disclosed functions. Thus, while FIG. 2 generally illustrates the EDA-based vehicle control system 100 as being self-contained, in various embodiments, the EDA-based vehicle control system 100 may be implemented within multiple separate devices some of which may be remote from the vehicle 102.

Figure 3:
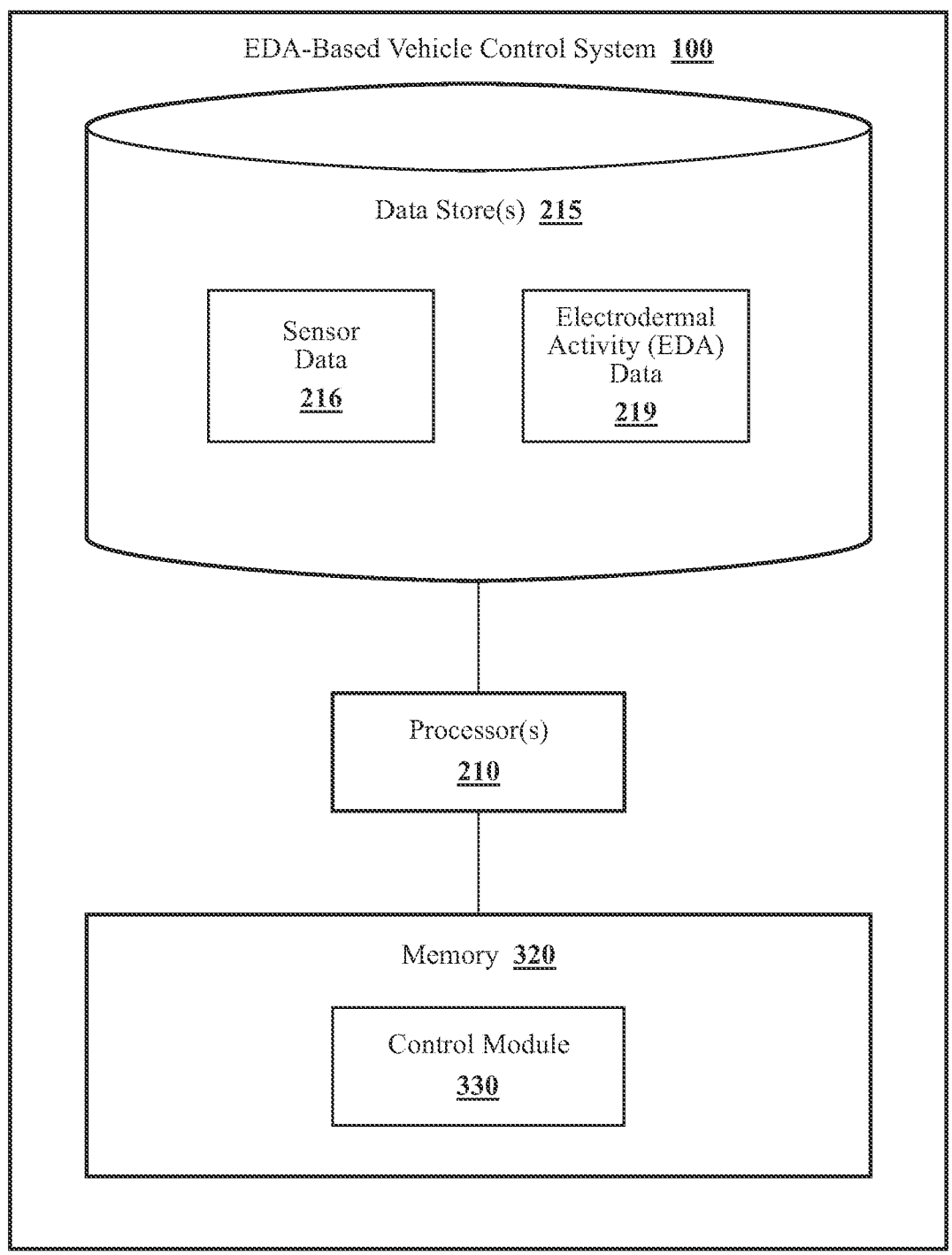
FIG. 3 is a more detailed block diagram of the EDA-based vehicle control system of FIG. 2.

With reference to FIG. 3, a more detailed block diagram of the EDA-based vehicle control system 100 is shown. The EDA-based vehicle control system 100 may include a processor(s) 210. Accordingly, the processor(s) 210 may be a part of the EDA-based vehicle control system 100, or the EDA-based vehicle control system 100 may access the processor(s) 210 through a data bus or another communication pathway. In one or more embodiments, the processor(s) 210 is an application-specific integrated circuit that may be configured to implement functions associated with a control module 330. More generally, in one or more aspects, the processor(s) 210 is an electronic processor, such as a microprocessor that can perform various functions as described herein when loading the control module 330 and executing encoded functions associated therewith.

The EDA-based vehicle control system 100 may include a memory 320 that stores the control module 330. The memory 320 may be a random-access memory (RAM), read-only memory (ROM), a hard disk drive, a flash memory, or other suitable memory for storing the control module 330. The control module 330 is, for example, a set of computer-readable instructions that, when executed by the processor(s) 210, cause the processor(s) 210 to perform the various functions disclosed herein. While, in one or more embodiments, the control module 330 is a set of instructions embodied in the memory 320, in further aspects, the control module 330 includes hardware, such as processing components (e.g., controllers), circuits, etc. for independently performing one or more of the noted functions.

The EDA-based vehicle control system 100 may include a data store(s) 215 for storing one or more types of data. Accordingly, the data store(s) 215 may be a part of the EDA-based vehicle control system 100, or the EDA-based vehicle control system 100 may access the data store(s) 215 through a data bus or another communication pathway. The data store 215 is, in one embodiment, an electronically based data structure for storing information. In at least one approach, the data store 215 is a database that is stored in the memory 320 or another suitable medium, and that is configured with routines that can be executed by the processor(s) 210 for analyzing stored data, providing stored data, organizing stored data, and so on. In either case, in one embodiment, the data store 215 stores data used by the control module 330 in executing various functions. In one embodiment, the data store 215 may be able to store sensor data 216, electrodermal activity (EDA) data 219, and/or other information that is used by the control module 330.

The data store(s) 215 may include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 215 may be a component of the processor(s) 210, or the data store(s) 215 may be operatively connected to the processor(s) 210 for use thereby. The term "operatively connected" or "in communication with" as used throughout this description, can include direct or indirect connections, including connections without direct physical contact.

In one or more arrangements, the data store(s) 215 can include sensor data 216. The sensor data 216 can originate from the sensor system 220 of the vehicle 102. The sensor data 216 can include data from visual sensors, audio sensors, biometric sensors and/or any other suitable sensors in the vehicle 102.

In one or more arrangements, the data store(s) 215 can include EDA data 219. The EDA data 219 can include EDA data measurements, and other types of data such as user identification, e.g., a fingerprint and/or a handprint of a user and biometric user information. In some instances, the user identification can include information about the size and/or shape of the hand of the user. Such user data can be based on average human data, user specific data, learned user data, and/or any combination thereof. The sensor data 216 and the EDA data 219 may be digital data that describe information used by the EDA-based vehicle control system 100 to control a vehicle system 240.

In one embodiment, the control module 330 may include instructions that, when executed by the processor(s) 210, cause the processor(s) 210 to, responsive to detecting an event based on sensor data 216, request a user place a hand of the user on the EDA sensor 228. The event may be the user appearing joyful, stressed, distracted, sleepy, and/or appearing to experience a medical crisis. A medical crisis may include, as an example, the user experiencing a heart attack, a stroke, and/or an asthma attack. The control module 330 may receive sensor data 216 from the data store 215 and/or the sensor system 220. The control module 330 may detect the event based on the received sensor data 216. As an example, the control module 330 may receive images and/or videos of the user. The images and/or videos may show the positioning of the user's head, face, eyes, and hands, as well as the expression on the user's face. As another example, the control module 330 may receive audio recording(s) of the user. The audio recording(s) may include sounds and/or noises within the vehicle 102. The control module 330 may use any suitable algorithm such as a machine learning process to determine whether the user appears joyful, stressed, distracted, sleepy, and/or appears to be experiencing a medical crisis based on the sensor data 216.

Upon detecting the event, the control module 330 may request the user place the hand of the user on the EDA sensor 228. The control module 330 may communicate with the user in any suitable manner to make the request. As an example, the control module 330 may output an audio request and/or a visual request. In such an example, the control module 330 may output the audio request using speakers in the vehicle 102 and/or speakers electronically connected to, as an example, a mobile device. The control module 330 may output a visual request on a vehicle display unit such as a Heads-Up Display (HUD) or instrument panel, and/or mobile device display unit.

The control module 330 may be configured to determine when the user's finger(s) and/or palm is in contact with the EDA sensor 228. The EDA sensor 228 may determine the area of contact with the EDA sensor 228 based on the perimeter of the area in contact with the user's finger(s) and/or palm. The EDA sensor 228 can determine the size and/or the shape of the contact area based on, as an example, the x-, y-coordinates of the contact area. The control module 330 may receive information indicating that the user's finger and/or palm is in contact with the EDA sensor 228 from the EDA sensor 228. In other words, the EDA sensor 228 may communicate to the control module 330 that the user's finger and/or palm is in contact with the EDA sensor 228. The control module 330 may then determine and/or distinguish between a finger and a palm based on size and shape as fingers tend to be narrower and longer than palms which tend to be wider and shorter. The control module 330 can include any suitable object recognition software to detect whether contact is being made by a user's finger, palm, both, or neither. The control module 330 can use any suitable technique, including, for example, template matching and other kinds of computer vision and/or image processing techniques and/or other artificial or computational intelligence algorithms or machine learning methods.

In one embodiment, the control module 330 may include instructions that, when executed by the processor(s) 210, cause the processor(s) 210 to acquire EDA data 219 relating to the user via the EDA sensor 228. As an example, in response to determining that the user's finger(s) and/or palm is in contact with the EDA sensor 228, the control module 330 can activate the EDA sensor 228 to acquire EDA data 219 from the user. In such an example, the EDA sensor 228 can acquire EDA data 219 from the user by measuring EDA using at least one of skin potential, resistance, conductance, admittance, and impedance. Skin potential can be the voltage measured between two points of contact between the user and the EDA sensor 228. Skin resistance can be the resistance measured between the two points of contact. Skin conductance can be the measurement of the electrical conductivity of the skin between the two points of contact. Skin admittance is determined by measuring relative permittivity and the resistivity of the skin, and by contact ratio between dry electrodes in the EDA sensor 228 and skin. Skin impedance can be the measurement of the impedance of the skin to alternating current of low frequency.

The control module 330 may also include instructions to acquire baseline EDA data. As an example, the control module 330 may request the user place the hand of the user on the EDA sensor 228 at an instance when no event is detected. In such an example, the EDA sensor 228 may acquire EDA data 219 from the user when the user does not appear to be distracted, sleepy and/or experiencing a medical crisis to use as baseline EDA data. As another example, the control module 330 may acquire baseline EDA data based on previous and historical EDA data acquisitions by the EDA sensor 228. As another example, the control module 330 may acquire baseline EDA data from other sources such as an external database storing EDA data.

In one embodiment, the control module 330 may include instructions that, when executed by the processor(s) 210, cause the processor(s) 210 to determine a condition of the user based on the EDA data 219. The control module 330 may determine the condition of the user based on the EDA data 219 and/or the baseline EDA data. The condition of the user may be a health issue or an emotional issue. Further, the condition of the user may be the user being distracted, the emotional state of the user (e.g., the user being happy, sad, or angry), and/or the user being fatigued. The control module 330 may determine the condition of the user based on the EDA data 219, the baseline EDA data, and/or additional sensor data from, as an example, the cameras 226 and/or the biometric sensors 229.

The control module 330 may compare the EDA data 219 to the baseline EDA data to determine the condition of the user. The control module 330 may utilize any suitable algorithm and/or machine learning process to determine the condition of the user. The control module 330 may determine the condition of the user using the sensor data 216 in addition to the EDA data 219 and/or the baseline EDA data. As an example, the control module 330 may determine that the user is having a heart attack based on a combination of the sensor data 216 from the biometric sensor 229 such as a heartbeat sensor, the EDA data 219 and the baseline EDA data.

In one embodiment, the control module 330 may include instructions that, when executed by the processor(s) 210, cause the processor(s) 210 to implement a vehicle action in response to the condition of the user. The vehicle action may be one of the following: adjust the dual-sided transparent display, adjust a visual device, adjust an audio device, assume control of a vehicle, adjust a driving style in the case of an autonomous vehicle, contact an emergency service, or perform a medical intervention. The visual device and the audio device may, as an example, part of the vehicle entertainment system.

Adjusting the dual-sided transparent display 104, 106, 108 includes at least one of following: identifying an object visible through the dual-sided transparent display or displaying a scene on the dual-sided transparent display. As an example, the control module 330 may receive sensor data 216 from the environment sensors 222 that identifies objects in the environment surrounding the vehicle 102. The control module 330 may control the dual-sided transparent display 104, 106, 108 to generate an outline of one or more of the object(s). As another example, the control module 330 may control the dual-sided transparent display 104, 106, 108 to display a scene from the environment around the vehicle 102 as captured by external camera(s) 226. As another example, the control module 330 may control the dual-sided transparent display 104, 106, 108 to display a dark screen or entertainment.

Adjusting a visual device may include powering off the visual device or adjusting (e.g., dimming) the screen of the visual device. Similarly, adjusting an audio device may include powering off the audio device or adjusting (e.g., reducing) the volume of the audio device. Assuming control of the vehicle 102 includes controlling one or more of the navigation system 247, the steering system 243, the throttle system 244, and/or the braking system 242. Adjusting the driving style of an autonomous vehicle may include modifying the driving style from a more aggressive driving style to a less aggressive driving style. Contacting an emergency service may include contacting a medical emergency service, police, fire, or any other suitable emergency service. Performing a medical intervention may include adjusting the environment within the vehicle cabin such as the temperature, the air pressure level, the oxygen level, and the humidity level in the vehicle cabin. Performing a medical intervention may include communicating with the user, administering a medication, or initiating a medical process such as administering a defibrillator.

The control module 330 may determine which vehicle actions to perform based on the condition of the user. The control module 330 may use any suitable algorithm or machine learning process to determine which vehicle action(s) to perform based on the condition of the user. The control module 330 may use a lookup table that associates the vehicle actions with the conditions of the user. As an example, the lookup table may include the following:

TABLE 1

| Condition of the User | Vehicle Action |
|---|---|
| Health Issue: Heart Attack and/or | Adjust the dual-sided transparent display Power off the visual device(s) Power off the audio device(s) |

TABLE 1-continued

| Condition of the User | Vehicle Action |
|---|---|
| Cardiac Arrest | Activate the internal vehicle camera(s) to record the user<br>Assume control of the vehicle and drive the vehicle to a hospital<br>Contact an emergency service such as the hospital and/or police<br>Perform a medical intervention such as administering a defibrillator. |
| Health Issue: Stroke | Adjust the dual-sided transparent display to display a scenery to engage the user and prevent the user from falling asleep<br>Adjust the volume of the audio device(s)<br>Activate internal vehicle cameras to record the user<br>Assume control of the vehicle and drive the vehicle to a hospital<br>Contact an emergency service such as the hospital and/or police |
| Health Issue: Asthma Attack | Activate internal vehicle cameras to record the user<br>Assume control of the vehicle and drive the vehicle to a hospital<br>Contact an emergency service such as the hospital and/or police |
| Health Issue: Fainting | Activate internal vehicle cameras to record the user<br>Assume control of the vehicle and drive the vehicle to a hospital<br>Contact an emergency service such as the hospital and/or police |
| Emotional Issue: Fatigued | Adjust the dual-sided transparent display to highlight objects in the environment surrounding the vehicle.<br>Assume control of the vehicle and drive the vehicle depending on the level of fatigue |
| Emotional Issue: Distracted | Adjust the dual-sided transparent display to highlight objects in the environment surrounding the vehicle<br>Power off the visual device(s)<br>Power off the audio device(s) |
| Emotional Issue: Stressed | Adjust the driving style of the autonomous vehicle such as reducing driving speed, more gradual or smooth stops, more gradual or smooth turns. |

The control module 330 may determine any suitable combination and association between the condition of the user and the vehicle actions and apply the vehicle actions accordingly.

Figure 4:
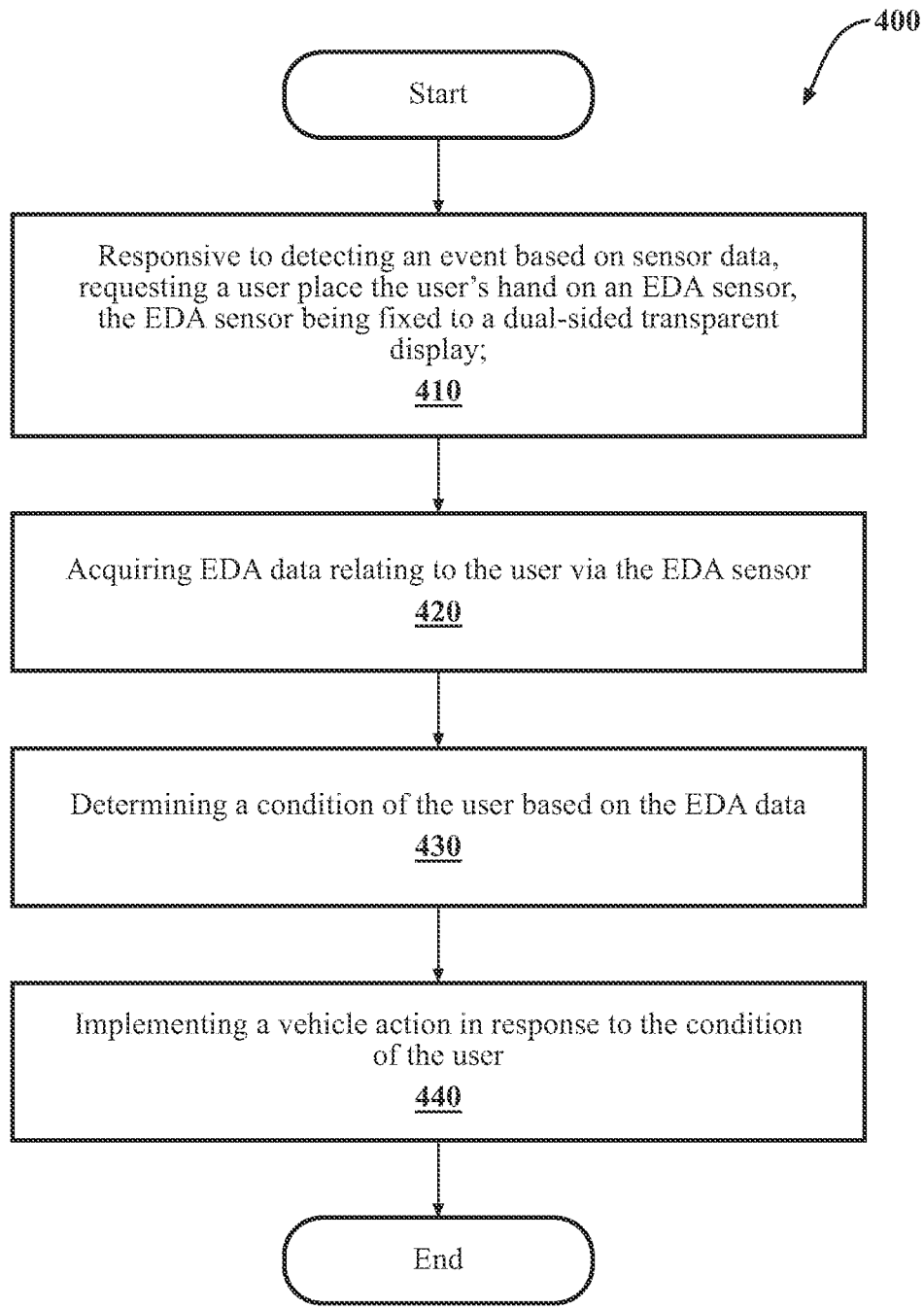
FIG. 4 is an example of a method for controlling a vehicle system in response to a condition of a user.

FIG. 4 illustrates a method 400 for controlling a vehicle system 240 in response to a condition of a user. The method 400 will be described from the viewpoint of the vehicle 102 of FIGS. 1-2 and the EDA-based vehicle control system 100 of FIGS. 1-3. However, the method 400 may be adapted to be executed in any one of several different situations and not necessarily by the vehicle 102 of FIGS. 1-2 and/or the EDA-based vehicle control system 100 of FIGS. 1-3.

At step 410, the control module 330 may cause the processor(s) 210 to, responsive to detecting an event based on the sensor data 216, request a user place the user's hand on the EDA sensor 228 that is fixed to a dual-sided transparent display 104, 106, 108. As previously mentioned, the control module 330 may determine that the event has occurred based on the sensor data 216 and may then request that the user place the user's hand on the EDA sensor 228.

At step 420, the control module 330 may cause the processor(s) 210 to acquire EDA data 219 relating to the user via the EDA sensor 228. As an example, the control module 330 activates the EDA sensor 228 and may receive EDA data 219 from the EDA sensor 228 upon activation.

At step 430, the control module 330 may cause the processor(s) 210 to determine a condition of the user based on the EDA data 219. As previously mentioned, the control module 330 may utilize any suitable algorithm to determine the condition of the user based on a combination of sensor data 216, EDA data 219, and/or baseline EDA data.

At step 440, the control module 330 may cause the processor(s) 210 to implement a vehicle action in response to the condition of the user. As an example, the control module 330 may take over control of the vehicle 102 if the user has fainted. As another example, the control module 330 may power off or disable a visual device or audio device if the user is distracted.

Figure 5A:
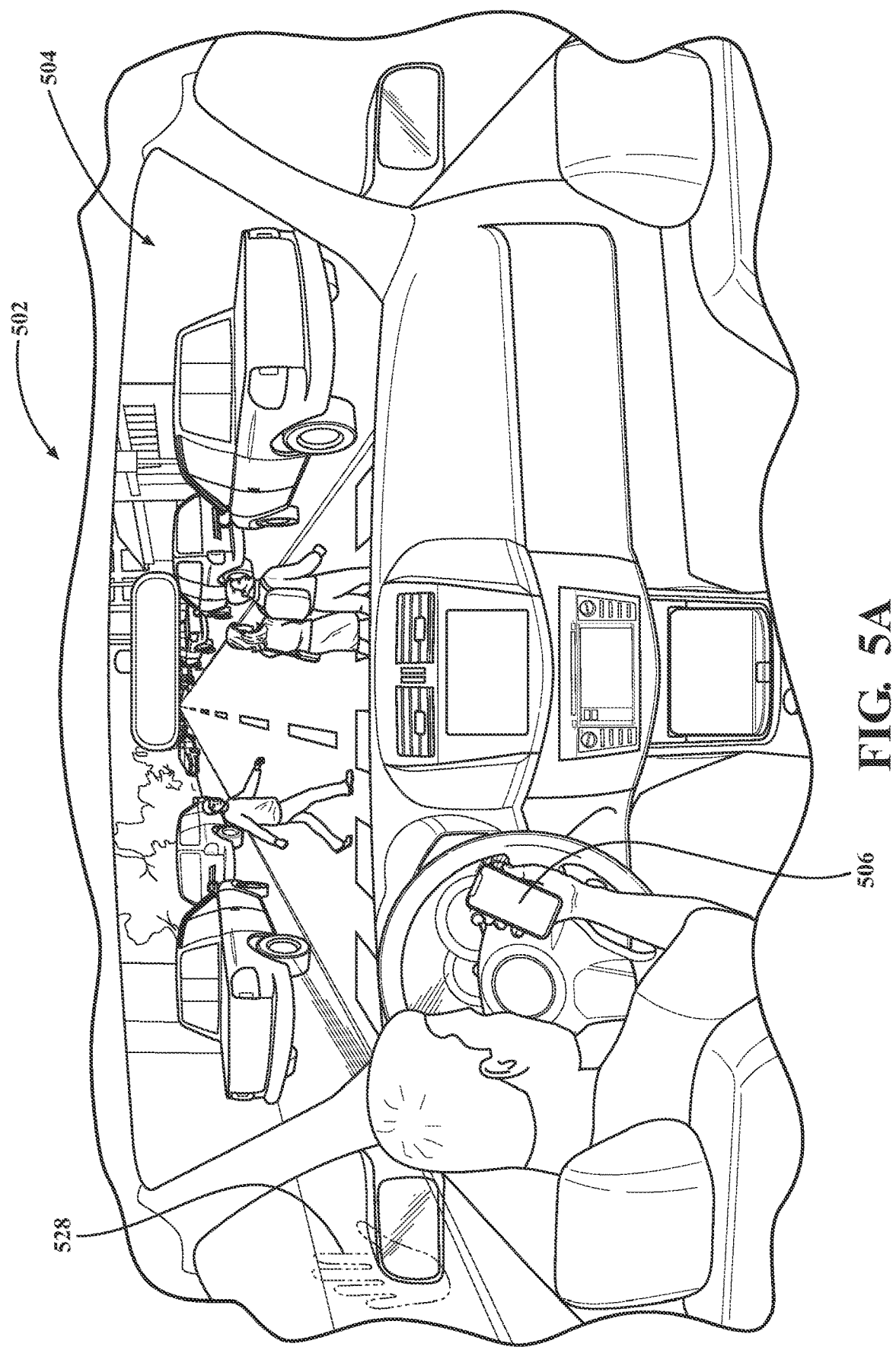
FIGS. 5A-5C are an example of controlling a vehicle system in response to a condition of a user.
Figure 5B:
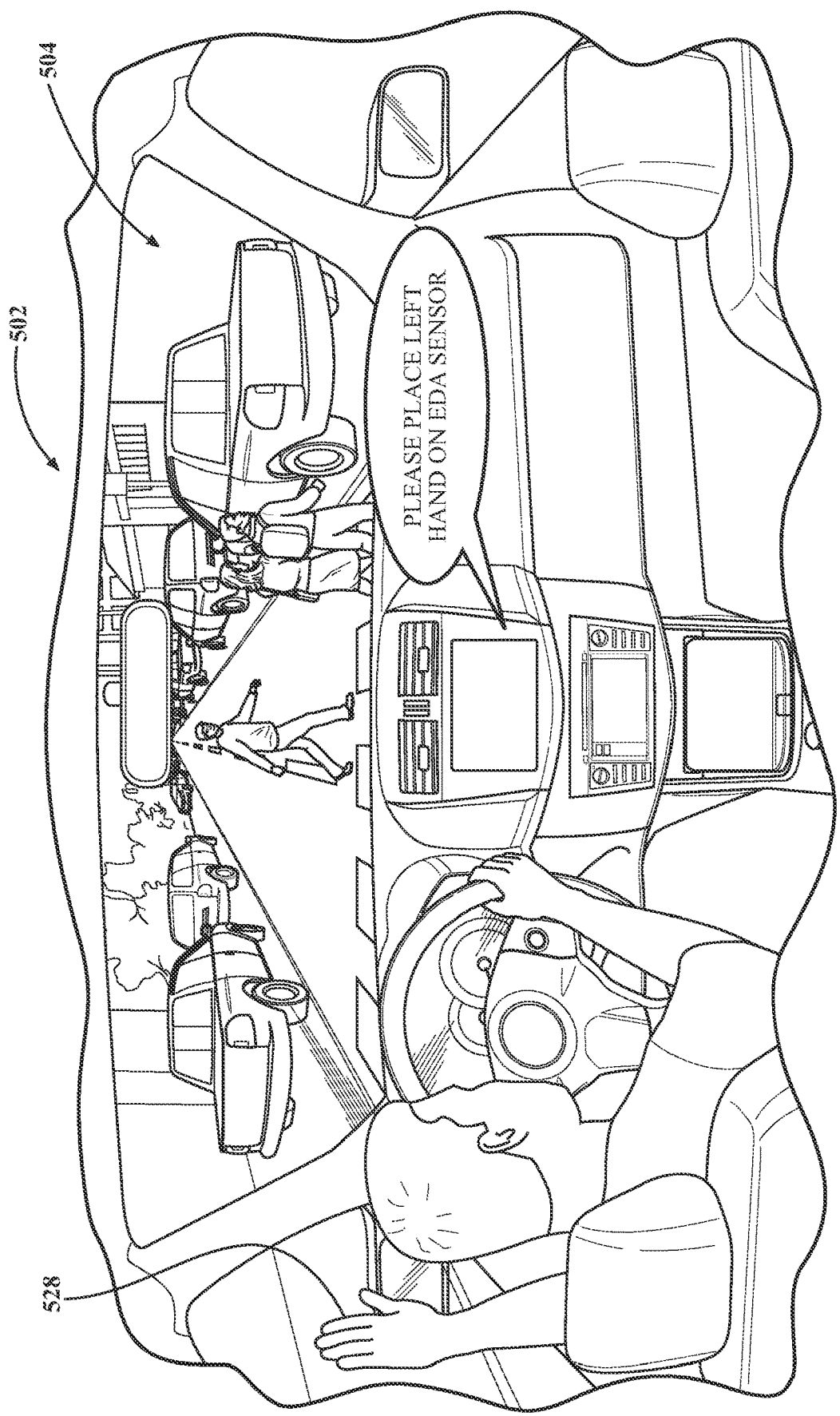
Figure 5C:
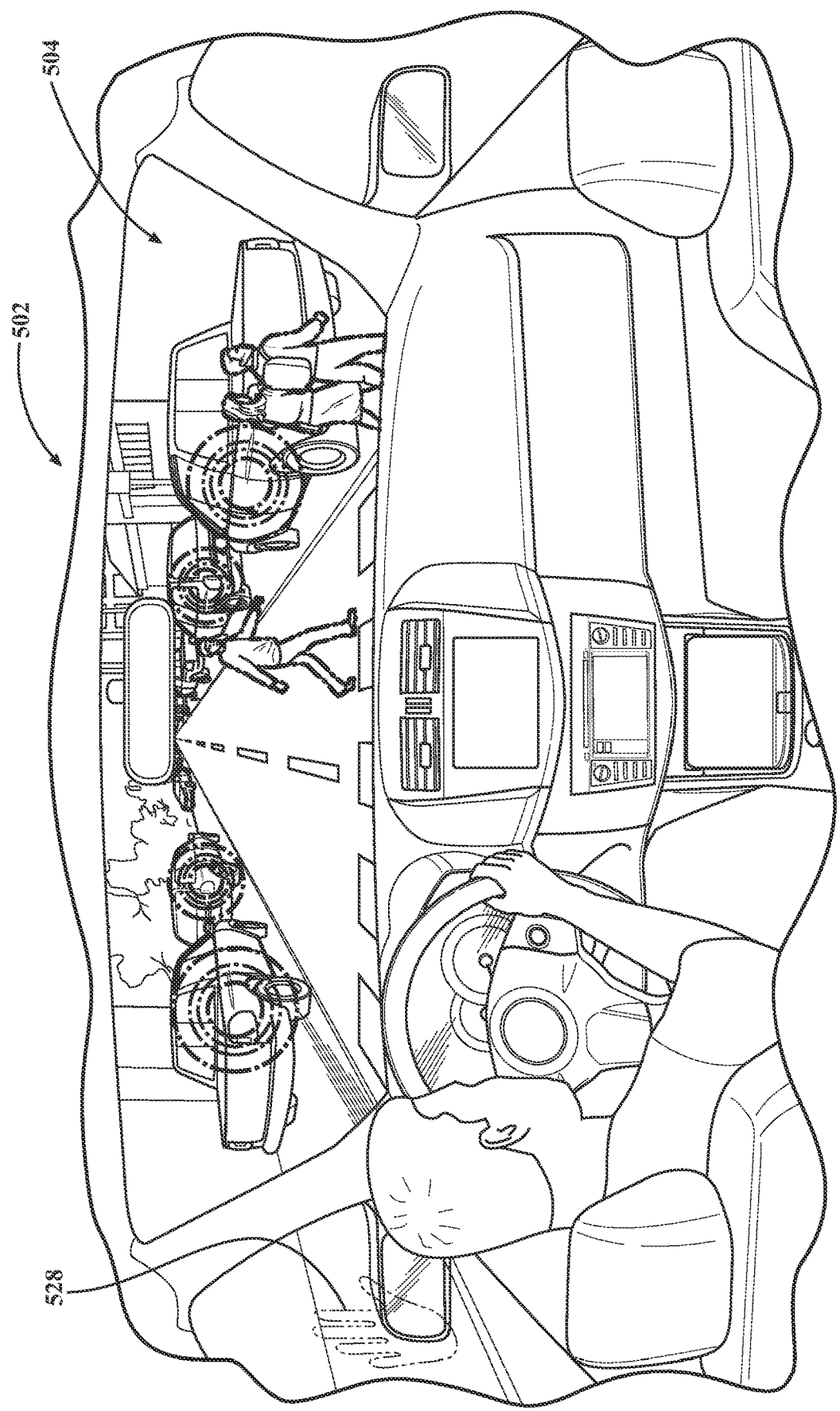

A non-limiting example of the operation of the EDA-based vehicle control system 100 and/or one or more of the methods will now be described in relation to FIGS. 5A-5C. FIGS. 5A-5C show an example of controlling a vehicle system 240 in response to a condition of a user.

As shown in FIG. 5A, the user is looking at a mobile device 506 and appears distracted. The environment sensors 222 such as the camera(s) 226 generate sensor data 216 indicating that the user is not looking at the road ahead. The control module 330 determines that an event has occurred based on the sensor data 216. The control module 330 determines that the event of the user appearing distracted has occurred by using any suitable machine learning process and the sensor data 216. As such and as shown in FIG. 5B, the control module 330 requests the user place their left hand on the EDA sensor 528 using the output system 135 such as vehicle speaker(s). The control module 330 determines that the user is distracted based on a combination of the EDA data 219 and the sensor data 216.

In FIG. 5C, the control module 330 disables the mobile device (not shown) and controls the dual-sided transparent display 504 to highlight objects in front of the vehicle 502 that are visible through the dual-sided transparent display 504.

FIG. 2 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 210. In one or more arrangements, the processor(s) 210 can be a main processor of the vehicle 102. For instance, the processor(s) 210 can be an electronic control unit (ECU). As previously mentioned, the processor(s) 210 may be a part of the EDA-based vehicle control system 100, or the EDA-based vehicle control system 100 may access the processor(s) 210 through a data bus or another communication pathway.

The vehicle 102 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term ""operatively connected"," as used throughout this description, can include direct or indirect connections, including connections without direct physical contact.

The one or more data stores 215 can include sensor data 216. In this context, "sensor data" means any information about the sensors that the vehicle 102 is equipped with, including the capabilities and other information about such sensors. As will be explained below, the vehicle 102 can include the sensor system 220. The sensor data 216 can relate to one or more sensors of the sensor system 220. As an example, in one or more arrangements, the sensor data 216 can include information on one or more vehicle sensors 221 and/or environment sensors 222 of the sensor system 220.

The data store(s) 215 can include electrodermal activity (EDA) data 219. The EDA data 219 includes data from the EDA sensor(s) 228. The EDA data 219 may include historical EDA data based on past readings and/or external sources such as databases. The EDA sensors 228 may be a part of the sensor system 220 as shown. Alternatively, the EDA sensors 228 may be separate from the sensor system 220.

In some instances, at least a portion of the sensor data 216 and/or the EDA data 219 can be located in one or more data stores 215 located onboard the vehicle 102. Alternatively, or in addition, at least a portion of the sensor data 216 and/or the EDA data 219 can be located in one or more data stores 215 that are located remotely from the vehicle 102.

As noted above, the vehicle 102 can include the sensor system 220. The sensor system 220 can include one or more sensors. "Sensor" means any device, component and/or system that can detect, and/or sense something. The one or more sensors can be configured to detect, and/or sense in real-time. As used herein, the term ""real-time"" means a level of processing responsiveness that a user or system senses as sufficiently immediate for a particular process or determination to be made, or that enables the processor 210 to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the vehicle 102 (including any of the elements shown in FIG. 2). The sensor system 220 can acquire data of at least a portion of the internal environment (e.g., inside the vehicle cabin) as well as the external environment of the vehicle 102 (e.g., nearby vehicles, pedestrians, objects).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 102 itself. In one or more arrangements, the vehicle sensor(s) 221 can be configured to detect, and/or sense position and orientation changes of the vehicle 102, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 102. In one or more arrangements, the vehicle sensor(s) 221 can include a speedometer to determine a current speed of the vehicle 102.

Alternatively, or in addition, the sensor system 220 can include one or more environment sensors 222 configured to acquire, and/or sense data inside the vehicle 102 as well as around the vehicle 102. Sensor data 216 inside the vehicle 102 can include information about one or more users in the vehicle cabin and any other objects of interest. Sensor data 216 around the vehicle 102 can include information about the external environment in which the vehicle 102 is located or one or more portions thereof.

As an example, the one or more environment sensors 222 can be configured to detect, quantify and/or sense objects in at least a portion of the internal and/or the external environment of the vehicle 102 and/or information/data about such objects.

In the internal environment of the vehicle 102, the one or more environment sensors 222 can be configured to detect, measure, quantify, and/or sense human users inside the vehicle 102 and the facial expressions of the user(s). In the external environment, the one or more environment sensors 222 can be configured to detect, measure, quantify, and/or sense objects in the external environment of the vehicle 102, such as, for example, lane markers, signs, traffic lights, traffic signs, lane lines, crosswalks, curbs proximate the vehicle 102, off-road objects, electronic roadside devices, etc.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 can include one or more radar sensors 223, one or more LIDAR sensors 224, one or more sonar sensors 225, one or more cameras 226, and/or one or more audio sensors 227. In one or more arrangements, the one or more cameras 226 can be high dynamic range (HDR) cameras or infrared (IR) cameras. The audio sensor(s) 227 can be microphones and/or any suitable audio recording devices. Any sensor in the sensor system 220 that is suitable for detecting and observing humans and/or human facial expression can be used inside the vehicle 102 to observe the users. Additionally, the sensor system 220 can include one or more EDA sensors 228 for detecting and/or recording electrodermal activity of the user(s). The sensor system 220 can include one or more biometric sensors 229 such as a heartbeat sensor, a body temperature sensor, a blood pressure sensor, an oxygen level sensor, and/or a blood sugar sensor.

The vehicle 102 can include an input system 230. An "input system" includes any device, component, system, element or arrangement or groups thereof that enable information/data to be entered into a machine. The input system 230 can receive an input from a user (e.g., a driver or a passenger). The vehicle 102 can include an output system 235. An "output system" includes any device, component, or arrangement or groups thereof that enable information/data to be presented to a user (e.g., a person, a vehicle passenger, etc.) such as a display interface or a speaker.

The vehicle 102 can include one or more vehicle systems 240. Various examples of the one or more vehicle systems 240 are shown in FIG. 2. However, the vehicle 102 can include more, fewer, or different vehicle systems 240. It should be appreciated that although particular vehicle systems are separately defined, each or any of the systems or portions thereof may be otherwise combined or segregated via hardware and/or software within the vehicle 102. The vehicle 102 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 102 and/or to determine a travel route for the vehicle 102. The navigation system 247 can include one or more mapping applications to determine a travel route for the vehicle 102. The navigation system 247 can include a global positioning system, a local positioning system or a geolocation system.

The vehicle 102 can include one or more autonomous driving systems 260. The autonomous driving system 260 can include one or more devices, applications, and/or combinations thereof, now known or later developed, configured to control the movement, speed, maneuvering, heading, direction, etc. of the vehicle 102. The autonomous driving system 260 can include one or more driver assistance systems such as a lane keeping system, a lane centering system, a collision avoidance system, and/or a driver monitoring system.

The autonomous driving system(s) 260 can be configured to receive data from the sensor system 220 and/or any other type of system capable of capturing information relating to the vehicle 102 and/or the external environment of the vehicle 102. In one or more arrangements, the autonomous driving system(s) 260 can use such data to generate one or more driving scene models. The autonomous driving system(s) 260 can determine position and velocity of the vehicle 102. The autonomous driving system(s) 260 can determine the location of obstacles, obstacles, or other environmental features including traffic signs, trees, shrubs, neighboring vehicles, pedestrians, etc.

The autonomous driving system(s) 260 can be configured to receive, and/or determine location information for obstacles within the external environment of the vehicle 102 for use by the processor(s) 210, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving system(s) 260 either independently or in combination with the EDA-based vehicle control system 100 can be configured to determine travel path(s), current autonomous driving maneuvers for the vehicle 102, future autonomous driving maneuvers and/or modifications to current autonomous driving maneuvers based on data acquired by the sensor system 220, driving scene models, and/or data from any other suitable source such as determinations from the sensor data 216 and the EDA data 219. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving system(s) 260 can be configured to implement determined driving maneuvers. The autonomous driving system(s) 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system(s) 260 can be configured to execute various vehicle functions and/or to transmit data to, receive data from, interact with, and/or control the vehicle 102 or one or more systems thereof (e.g., one or more of vehicle systems 240).

The processor(s) 210, the EDA-based vehicle control system 100, and/or the autonomous driving system(s) 260 can be operatively connected to communicate with the various vehicle systems 240 and/or individual components thereof. For example, the processor(s) 210, the EDA-based vehicle control system 100, and/or the autonomous driving system(s) 260 can be in communication to send and/or receive information from the various vehicle systems 240 to control the movement, speed, maneuvering, heading, direction, etc. of the vehicle 102. The processor(s) 210, the EDA-based vehicle control system 100, and/or the autonomous driving system(s) 260 may control some or all of these vehicle systems 240 and, thus, may be partially or fully autonomous.

The processor(s) 210, the EDA-based vehicle control system 100, and/or the autonomous driving system(s) 260 may be operable to control the navigation and/or maneuvering of the vehicle 102 by controlling one or more of the vehicle systems 240 and/or components thereof. As an example, when operating in an autonomous mode, the processor(s) 210, the EDA-based vehicle control system 100, and/or the autonomous driving system(s) 260 can control the direction and/or speed of the vehicle 102. As another example, the processor(s) 210, the EDA-based vehicle control system 100, and/or the autonomous driving system(s) 260 can activate, deactivate, and/or adjust the parameters (or settings) of the one or more driver assistance systems. The processor(s) 210, the EDA-based vehicle control system 100, and/or the autonomous driving system(s) 260 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving system(s) 260. Any suitable actuator can be used. For instance, the one or more actuators 250 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on the 'user's computer, partly on the 'user's computer, as a stand-alone software package, partly on the 'user's computer and partly on a remote computer, or entirely on the remote computer or server. In the latter scenario, the remote computer may be connected to the 'user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially equal" means exactly equal and slight variations therefrom. "Slight variations therefrom" can include within 15 percent/units or less, within 14 percent/units or less, within 13 percent/units or less, within 12 percent/units or less, within 11 percent/units or less, within 10 percent/units or less, within 9 percent/units or less, within 8 percent/units or less, within 7 percent/units or less, within 6 percent/units or less, within 5 percent/units or less, within 4 percent/units or less, within 3 percent/units or less, within 2 percent/units or less, or within 1 percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A system comprising:
   a dual-sided transparent display;
   an EDA sensor fixed to the dual-sided transparent display;
   a processor; and
   a memory storing machine-readable instructions that, when executed by the processor, cause the processor to:
   responsive to detecting an event based on sensor data, request a user place a hand of the user on the EDA sensor;
   acquire EDA data relating to the user via the EDA sensor;
   determine a condition of the user based on the EDA data; and
   implement a vehicle action in response to the condition of the user.

2. The system of claim 1, wherein the event is at least one of:
   the user appearing distracted,
   the user appearing sleepy, or
   the user appearing to experience a medical crisis.

3. The system of claim 1, wherein the machine-readable instructions further include
   machine-readable instructions that, when executed by the processor, cause the processor to:
   acquire baseline EDA data; and
   wherein determining the condition of the user includes determining the condition of the user based on the baseline EDA data.

4. The system of claim 1, wherein the condition of the user is at least one of:
   a health issue or an emotional issue.

5. The system of claim 1, wherein the vehicle action is at least one of:
   adjust the dual-sided transparent display;
   adjust a visual device;
   adjust an audio device;
   assume control of a vehicle;
   adjust a driving style of an autonomous vehicle;
   contact an emergency service; or
   perform a medical intervention.

6. The system of claim 5, wherein adjust the dual-sided transparent display includes at least one of:
   identify an object visible through the dual-sided transparent display; or
   display a scene on the dual-sided transparent display.

7. A system comprising:
   a dual-sided transparent display; and
   an EDA sensor fixed to the dual-sided transparent display, the dual-sided transparent display is located in at least one of a vehicle window or windshield.

8. A method comprising:
   responsive to detecting an event based on sensor data, requesting a user place a hand of the user on an EDA sensor, the EDA sensor being fixed to a dual-sided transparent display;
   acquiring EDA data relating to the user via the EDA sensor;
   determining a condition of the user based on the EDA data; and
   implementing a vehicle action in response to the condition of the user.

9. The method of claim 8, wherein the event is at least one of:
   the user appearing joyful,
   the user appearing stressed,
   the user appearing distracted,
   the user appearing sleepy, or
   the user appearing to experience a medical crisis.

10. The method of claim 8, further comprising:
    acquiring baseline EDA data; and wherein determining the condition of the user includes determining the condition of the user based on the baseline EDA data.

11. The method of claim 8, wherein the condition of the user is at least one of:
    a health issue or an emotional issue.

12. The method of claim 8, wherein the vehicle action is at least one of:
    adjusting the dual-sided transparent display;
    adjusting a visual device;
    adjusting an audio device;
    assuming control of a vehicle;
    adjusting a driving style of an autonomous vehicle;
    contacting an emergency service; or
    performing a medical intervention.

13. The method of claim 12, wherein adjusting the dual-sided transparent display includes at least one of:
    identifying an object visible through the dual-sided transparent display; or
    displaying a scene on the dual-sided transparent display.

14. The method of claim 8, wherein the dual-sided transparent display is located in at least one of a vehicle window or windshield.

15. A non-transitory computer-readable medium including machine-readable instructions that, when executed by a processor, cause the processor to:
    responsive to detecting an event based on sensor data, request a user place a user's hand on an EDA sensor, the EDA sensor being fixed to a dual-sided transparent display;
    acquire EDA data relating to the user via the EDA sensor;
    determine a condition of the user based on the EDA data; and
    implement a vehicle action in response to the condition of the user.

16. The non-transitory computer-readable medium of claim 15, wherein the event is at least one of:
    the user appearing joyful,
    the user appearing stressed,
    the user appearing distracted,
    the user appearing sleepy, or
    the user appearing to experience a medical crisis.

17. The non-transitory computer-readable medium of claim 15, wherein the machine-readable instructions further include machine-readable instructions that, when executed by the processor, cause the processor to:
    acquire baseline EDA data; and wherein determining the condition of the user includes determining the condition of the user based on the baseline EDA data.

18. The non-transitory computer-readable medium of claim 15, wherein the condition of the user is at least one of:
    a health issue or an emotional issue.

19. The non-transitory computer-readable medium of claim 15, wherein the vehicle action is at least one of:
- adjust the dual-sided transparent display;
- adjust a visual device;
- adjust an audio device;
- assume control of a vehicle;
- adjust a driving style of an autonomous vehicle;
- contact an emergency service; or
- perform a medical intervention.

* * * * *